(12) United States Patent
Takagi et al.

(10) Patent No.: US 6,435,556 B1
(45) Date of Patent: Aug. 20, 2002

(54) SUBFRAME FOR SUSPENSION

(75) Inventors: Masaomi Takagi, Yokohama; Takahiro Watanabe; Hideyori Sakuragi, both of Kanagawa, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/678,674

(22) Filed: Oct. 4, 2000

(30) Foreign Application Priority Data

Oct. 7, 1999 (JP) .......................................... 11-286940

(51) Int. Cl.⁷ ............................................... B62D 21/15
(52) U.S. Cl. ...................... 280/784; 180/299; 180/311; 180/312; 280/781
(58) Field of Search ................................. 280/781, 784, 280/785, 788, 124.109; 180/311, 312, 299

(56) References Cited

U.S. PATENT DOCUMENTS 6,109,654 A * 8/2000 Yamamoto et al. ......... 280/784

FOREIGN PATENT DOCUMENTS

| JP | 3-135889 | * | 6/1991 | ................. 180/311 |
| JP | 5-25570 |  | 4/1993 | |

* cited by examiner

*Primary Examiner*—Eric Culbreth
(74) *Attorney, Agent, or Firm*—Foley & Lardner

(57) ABSTRACT

A subframe for suspension of a vehicle includes at least a hollow frame member and a connecting member joined with an end of the hollow frame member. The connecting member includes a bracket section supporting a link of a suspension, and a collar section formed with a circular hole for receiving an insulator. The connecting member further includes at least one projection projecting from the collar section and defining an enlarged continuous joint surface with the collar section. The hollow member is joined by butt welding to the joint surface formed by the projection and the collar section.

12 Claims, 3 Drawing Sheets

SUBFRAME FOR SUSPENSION

BACKGROUND OF THE INVENTION

The present invention relates to a vehicle having a subframe, supported elastically through one or more insulators to a vehicle body frame, for supporting suspension members. More specifically, the present invention relates to structures of connecting portions of the subframe.

SUMMARY OF THE INVENTION

It is an object of the present invention to provide a subframe or frame for a suspension which is advantageous to the production process. Another object is to provide such a subframe or frame having a portion for absorbing energy of external forces.

According to the present invention, a subframe or frame for suspension, comprises a hollow frame member and a connecting member joined with an end of the hollow frame member. The connecting member comprises a bracket section adapted to be connected to a link of a suspension, a collar section including a hole for receiving an insulator, and a projection projecting from the collar section and defining a continuous joint surface with the collar section. The end of the hollow member is joined to the joint surface of the projection and the collar section. The connecting member may further comprise an intermediate section having a hollow portion extending between the bracket section and the collar section.

DETAILED DESCRIPTION OF THE INVENTION

Figure 3:
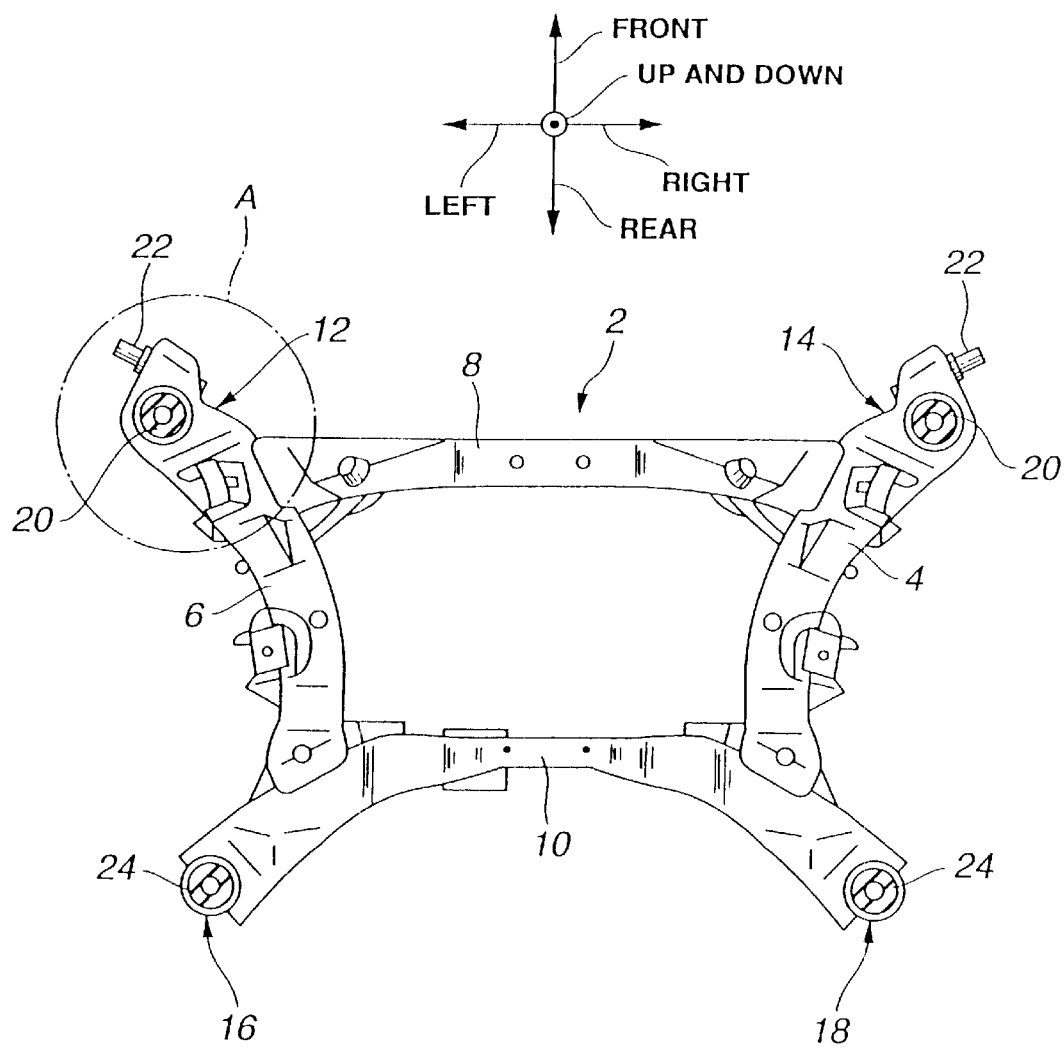
FIG. 3 is a plan view showing a suspension subframe of earlier technology.
Figure 4:
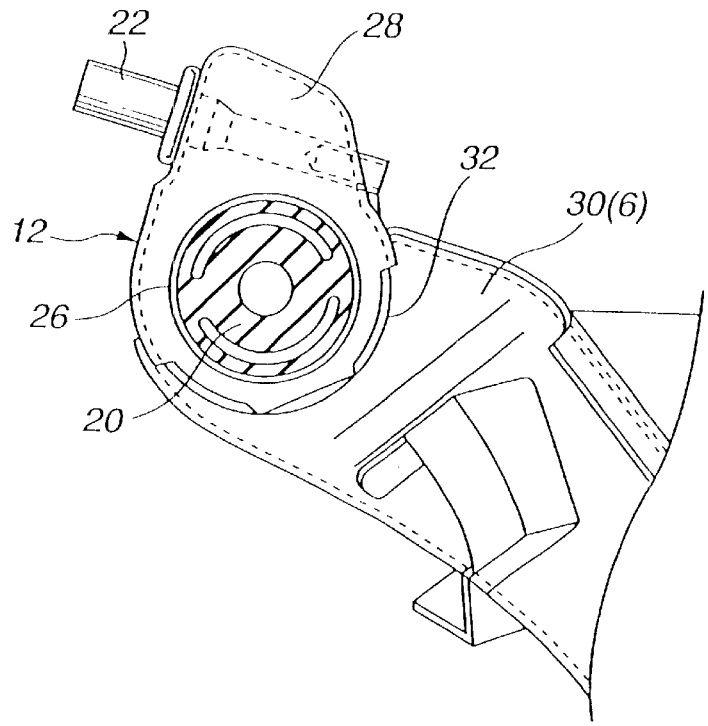
FIG. 4 is an enlarged view showing a part of the subframe of FIG. 3.

To facilitate understanding the present invention, reference is first made to a suspension subframe 2 of earlier technology. FIG. 3 shows the suspension subframe 2 as viewed from above. FIG. 4 shows a portion encircled by a one dot chain line circle A in FIG. 3.

Subframe 2 includes a pair of side members 4 and 6 and a pair of cross members 8 and 10 connecting side members 4 and 6 so as to form a frame structure. Side members 4 and 6 extend along a longitudinal (front and rear) direction of a vehicle, with a space separating both side members along a lateral (left and right) direction of the vehicle. Cross members 8 and 10 extend along the lateral direction, and connect side members 4 and 6. Cross member 8 is located in front of cross member 10. There are further provided front connecting members 12 and 14 fixed, respectively, to the front ends of side members 4 and 6, and rear connecting members 16 and 18 fixed to the rear ends of side members 4 and 6.

Each of front connecting members 12 and 14 is equipped with an insulator 20 for elastically supporting subframe 2 to a vehicle body frame (not shown), and a link shaft 22 for connecting to a link of a suspension.

Each of rear frame connecting members 16 and 18 is equipped with an insulator 24 for elastically supporting subframe 2 to the body frame.

Connecting member 12 is a box-shaped hollow member formed by press forming or folding. As shown in FIG. 4, connecting member 12 has a collar section 26 into which the insulator 20 is forcibly fit, and a bracket section 28 supporting link shaft 22 passing therethrough. Collar section 26 is located adjacently to a bulging curved joint surface 32, and bracket section 28 is remote from curved joint surface 32.

Side member 6 shown in FIG. 4 is a hollow frame structural member 30 having a rectangular or square cross section. The front end of frame member 30 is cut by press working, to have a concave cutout fitting to convex joint surface 32. Frame member 30 and connecting member 12 are joined together by butt welding between convex joint surface 32 and the concave end of frame member 30. The other front connecting member 14 is identical in construction to connecting member 12. As shown in FIG. 3, subframe 2 is substantially symmetrical with respect to a median plane dividing subframe 2 into left and right equal halves, so that right front connecting member 14 is substantially a mirror image of left front connecting member 12.

Figure 5:
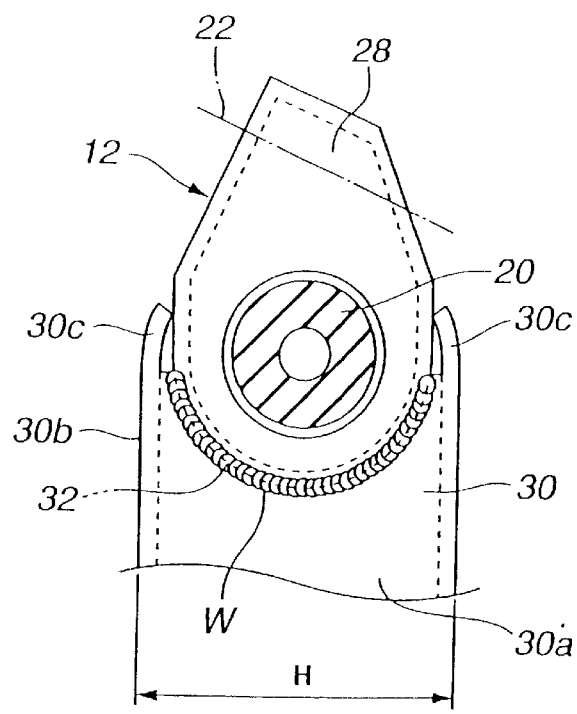
FIG. 5 is a view showing a weld structure of earlier technology between a connecting member and a frame member.

FIG. 5 shows joint surface 32 of connecting member 12 and the joint or weld end of frame member 30. The dimension H of joint surface 32 along a widthwise direction is approximately equal to the width of frame member 30. Therefore, escape lips 30c are formed in side walls 30b to prevent plastic deformation of side walls 30b before an operation of press working for cutting upper wall 30a and lower wall of frame member 30 to form the deeply depressed concave cutouts conforming to bulging convex joint surface 32.

As a result, the process for welding between joint surface 32 and the end of frame member 30 involves an operation for welding the edge of upper wall 30a to joint surface 32 along a weld line W, and for welding the edge of the lower wall to joint surface 32, and an operation for welding escape lips 30c to joint surface 32 after reshaping escape lips 30c to enable the welding. The process for welding along the entire periphery of the front end of frame member 30 requires much time and labor.

The strength of the joint can be increased by increasing the size of joint surface 32. However, this increases the manufacturing cost by additional pressing or bending operations to increase the area of joint surface 32.

If a strong external force is applied through the link to link shafts 22, the force can be transmitted through connecting members 12 and 14, cross members 8 and 10 and side members 4 and 6, to mechanisms mounted on the vehicle body, without absorption of energy.

Figure 1:
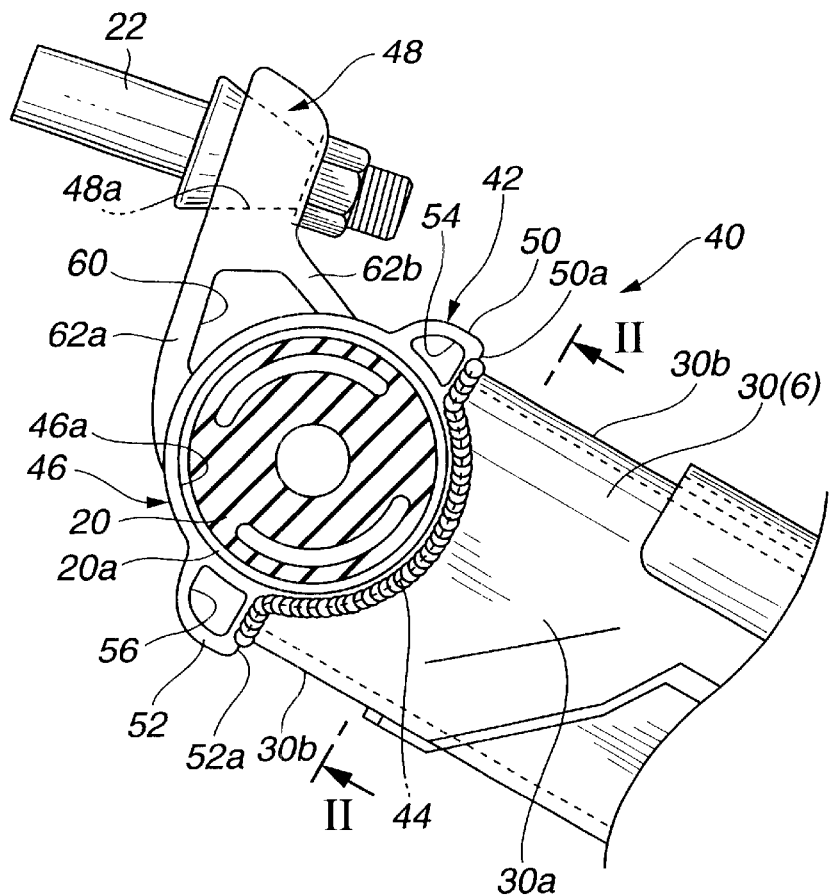
FIG. 1 is a view showing a joint structure between a connecting member and a frame member of a suspension subframe according to one embodiment of the present invention.
Figure 2:
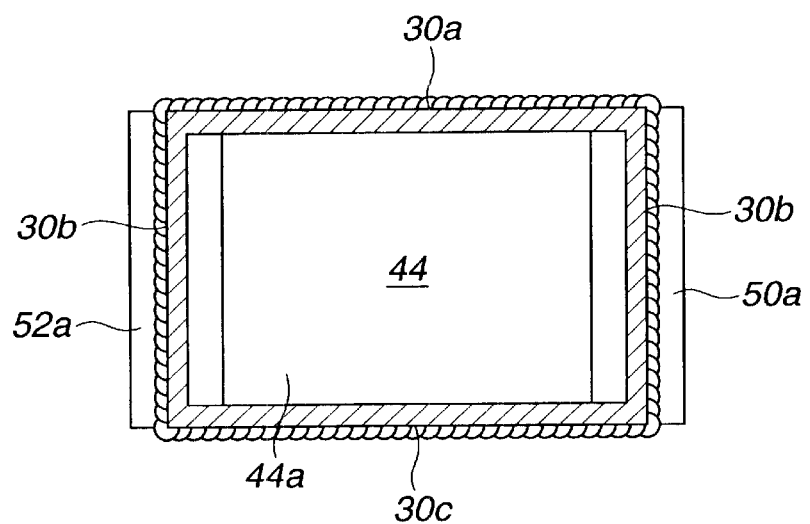
FIG. 2 is a view as viewed from a direction shown by arrows II and II in FIG. 1.

FIGS. 1 and 2 show a suspension subframe 40 according to one embodiment of the present invention, designed to facilitate the production process, and to perform a function of absorbing energy of external forces.

Subframe 40 is substantially symmetrical in a manner of bilateral symmetry like subframe 2 shown in FIG. 3, and substantially identical in construction to subframe 2 of FIG. 3 except for the following points. FIG. 1 shows a left side member 6 extending generally along the longitudinal (front and rear) direction of a vehicle, and a front left connecting member 42 joined to the front end of left side member 6. FIG. 2 shows a joint surface 44 as viewed from a direction shown by arrows II and II in FIG. 1. Side member 6 shown in FIG. 1 is a hollow structural frame member 30 having a rectangular or square cross section as in the structure shown in FIGS. 4 and 5.

Connecting member 42 shown in FIG. 1 is a single jointless piece of aluminum alloy shaped into a continuous form by extrusion. Connecting member 42 has a collar section 46 defining a joint surface 44, and a bracket section 48 located at a position remote from joint surface 44. Bracket section 48 is separated from joint surface 44 by collar section 46. Collar section 46 has a circular hole 46a formed continuously along an extruding direction. In FIG. 1, the extruding direction is perpendicular to the drawing sheet. An outer cylindrical member 20a of an insulator 20 is forcibly fit into circular hole 46a of collar section 46.

Joint surface 44 has a convex region 44a bulging outward toward side member 30. In this example, the curvature of convex region 44a is smaller than that of joint surface 32 shown in FIG. 5. Convex region 44a is in the form of a cylindrical surface.

Connecting member 42 shown in FIG. 1 has first and second projections 50 and 52 projecting outwards integrally from collar section 46, like ears. Projections 50 and 52 are formed continuously along the extruding direction. Each of first and second projections 50 and 52 has a hollow portion or cavity 54 or 56 formed continuously along the extruding direction.

Each of first and second projections 50 and 52 has a projecting surface 50a or 52a forming continuous joint surface 44 with convex region 44a defined by collar section 46. In this example, projecting surfaces 50a and 52a are flat, and face in the same direction. Continuous joint surface 44 includes center convex region 44a defined by the cylindrical surface of collar section 46, a first side region defined by projecting surface 50a of first projection 50, and a second side region defined by projecting surface 52a of second projection 52. Convex region 44a is located between first and second side regions 50a and 52a. In the example of FIG. 1, convex region 44a bulges outward only to a smaller extent than joint surface 32 of FIG. 5. In the cross section of FIG. 1, convex region 44a extends around the circular hole 46a like an arc of a circle concentric with the circle of circular hole 46a from a first end point on a first radius to a second end point on a second radius, and the angle subtended at the center between the first and second radii by convex region 44a is smaller than 180° and smaller than the angle subtended at the center by the circular arc of joint surface 32 shown in FIG. 5. First and second side regions 50a and 52a extend like a secant passing through the first and second end points in the cross section of FIG. 1.

Connecting member 42 further includes an intermediate section formed with a hollow portion or cavity 60. The intermediate section is located between collar section 46 and bracket section 48. Hollow portion 60 is formed continuously along the extruding direction. The intermediate section includes first and second weakened thin wall segments 62a and 62b defining hollow portion 60 therebetween.

Bracket section 48 has a through hole 48a through which link shaft 22 extends. Through hole 48a is formed by machining after the extruding operation for forming connecting member 42.

Hollow frame member 30 of side member 6 has side walls 30b and upper and lower walls 30a and 30c forming a box-shaped cross section like a box girder. Each of upper and lower walls 30a and 30c is formed with a concave cutout which is shaped like a circular arc in FIG. 1 and which is located between side walls 30b with spacing from each side wall 30b. The cutouts in upper and lower walls 30a and 30c are smaller and shallower than the concave cutouts shown in FIGS. 4 and 5.

In this example, the edge of each side wall 30b is straight and upright as shown in FIG. 2. As shown in FIG. 1, the edge of each of upper and lower walls 30a and 30c includes first and second relatively short straight segments and a concave circular arc segment extending between the first and second relatively short straight segments, and having the shape of a circular arc conforming to cylindrical convex region 44a defined by collar section 46 of connecting member 42. In the example of FIGS. 1 and 2, the width of joint surface 44 including first and second side regions 50a and 52a is greater than the width of frame member 30, and first and second side regions 50a and 52a project outward, respectively, from first and second side walls 30b of frame member 30.

Connecting member 42 and hollow frame member 30 of side member 6 are joined together by butt welding. Connecting member 42 and hollow frame member 30 are placed end to end so that cylindrical convex region 44a of connecting member 42 is fit in the circular arc segments of the edges of upper and lower walls 30a and 30c, and side regions 50a and 52a of joint surface 44 abut against the short straight segments of the edges of upper and lower walls 30a and 30c, and the edges of upright side walls 30b. Then, these edges are welded to the joint surface 44 along the entire perimeter of the rectangle formed by these edges of hollow frame member 30.

In this way, connecting member 42 and frame member 30 are joined together easily and quickly without requiring a special addition step.

The hollow portions 54 and 56 can serve for heat balance. The hollow portions 54 and 56 act to prevent a difference in heat capacity from increasing between projections 50 and 52 and the edges of side walls 30b, and to prevent the edges of side walls 30b from melting too much to achieve the weld structure of higher quantity.

Projections 50 and 52 with hollow portions 54 and 56 and hollow portion 60 are readily formed by extrusion of aluminum alloy. This production process is effective in reducing the production cost as compared to the process of press forming and bending operations.

If an external force of a great magnitude is inputted to the link shaft 22 through the link, the weakened segments 62a and 62b formed between bracket section 48 and collar section 46 can absorb the external force by deforming plastically. Thus, the subframe 40 can protect devices mounted on the vehicle body against impact. The segments 62a and 62b when deformed are easy to find and hence advantageous for repairs.

This application is based on a prior Japanese Patent Application No. 11(1999)-286940. The entire contents of this Japanese Patent Application No. 11(1999)-286940 with a filing date of Oct. 7, 1999 in Japan are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A subframe, comprising:
a hollow frame member; and
a connecting member joined with an end of the hollow frame member, the connecting member comprising, a bracket section adapted to be connected to a link of a suspension, a collar section including a hole for receiving an insulator, and a projection projecting from the collar section and defining a continuous joint surface with the collar section, the end of the hollow frame member being joined to the joint surface of the projection and the collar section;

wherein the connecting member is a metal piece formed by extrusion, and the end of the hollow frame member is butt-welded to the joint surface of the connecting member, and the end of the hollow frame member has a periphery which is entirely butt-welded to the joint surface of the connecting member.

2. The subframe as claimed in claim 1, wherein the bracket section is separated from the joint surface by the collar section lying between the joint surface and the bracket section.

3. The subframe as claimed in claim 1, wherein the projection comprises a hollow portion extending along a direction along which the hole of the collar section extends.

4. The subframe as claimed in claim 1, wherein the projection is a first projection; the connecting member further comprises a second projection; the first and second projections project from the collar section in opposite directions and define the continuous joint surface including a first side region formed by the first projection, a second side region formed by the second projection and a center region formed by the collar section, and located between the first and second side regions; and the end of the hollow frame member is joined to each of the first and second side regions and the center region of the joint surface.

5. The subframe as claimed in claim 4, wherein the end of the hollow frame member comprises first and second side edges welded, respectively, to the first and second side regions of the joint surface of the connecting member, and upper and lower edges welded to the center region of the joint surface of the connecting member.

6. The subframe as claimed in claim 4, wherein the hole of the collar section extends along a predetermined extruding direction, each of the first and second projections comprises a hollow portion extending along the extruding direction.

7. The subframe as claimed in claim 1, wherein the hollow frame member is a first hollow side member, the connecting member is a first connecting member, the subframe further comprises a second connecting member, a second hollow side member, first and second cross members connecting the first and second side members to form a frame structure, the second connecting member comprising a bracket section adapted to be connected to a link of a suspension, a collar section including a hole for receiving an insulator, and a projection projecting from the collar section and defining a continuous joint surface with the collar section, an end of the second side hollow member being joined to the joint surface of the projection and the collar section of the second connecting member.

8. A subframe comprising:

a hollow frame member; and a connecting member joined with an end of the hollow frame member, the connecting member comprising, a bracket section adapted to be connected to a link of a suspension, a collar section including a hole for receiving an insulator, and a projection projecting from the collar section and defining a continuous joint surface with the collar section, the end of the hollow frame member being joined to the joint surface of the projection and the collar section;

wherein the connecting member further comprises an intermediate section having a hollow portion extending, between the bracket section and the collar section, along a direction along which the hole of the collar section extends.

9. The subframe as claimed in claim 8, wherein the intermediate section of the connecting member comprises a weakened portion weakened by the hollow portion formed in the intermediate section.

10. A subframe comprising:

a hollow frame member; and a connecting member joined with an end of the hollow frame member, the connecting member comprising, a bracket section adapted to be connected to a link of a suspension, a collar section including a hole for receiving an insulator, and a projection projecting from the collar section and defining a continuous joint surface with the collar section, the end of the hollow frame member being joined to the joint surface of the projection and the collar section;

wherein the projection is a first projection; the connecting member further comprises a second projection; the first and second projections project from the collar section in opposite directions and define the continuous joint surface including a first side region formed by the first projection, a second side region formed by the second projection and a center region formed by the collar section, and located between the first and second side regions; and the end of the hollow frame member is joined to each of the first and second side regions and the center region of the joint surface;

wherein the end of the hollow frame member comprises first and second side edges welded, respectively, to the first and second side regions of the joint surface of the connecting member, and upper and lower edges welded to the center region of the joint surface of the connecting member; and wherein the center region of the joint surface is convex, and bulges outward between the first and second side regions, and each of the upper and lower edges comprises a concave segment welded to the center region of the joint surface.

11. A subframe comprising:

a hollow frame member; and a connecting member joined with an end of the hollow frame member, the connecting member comprising, a bracket section adapted to be connected to a link of a suspension, a collar section including a hole for receiving an insulator, and a projection projecting from the collar section and defining a continuous joint surface with the collar section, the end of the hollow frame member being joined to the joint surface of the projection and the collar section;

wherein the projection is a first projection; the connecting member further comprises a second projection; the first and second projections project from the collar section in opposite directions and define the continuous joint surface including a first side region formed by the first projection, a second side region formed by the second projection and a center region formed by the collar section, and located between the first and second side regions; and the end of the hollow frame member is joined to each of the first and second side regions and the center region of the joint surface;

wherein the end of the hollow frame member comprises first and second side edges welded, respectively, to the first and second side regions of the joint surface of the connecting member, and upper and lower edges welded to the center region of the joint surface of the connecting member; and wherein the center region of the joint surface is cylindrical, and each of the first and second side regions is substantially flat.

12. A subframe comprising:

a hollow frame member; and a connecting member joined with an end of the hollow frame member, the connecting member comprising,
- a bracket section adapted to be connected to a link of a suspension,
- a collar section including a hole for receiving an insulator, and
- a projection projecting from the collar section and defining a continuous joint surface with the collar section, the end of the hollow frame member being joined to the joint surface of the projection and the collar section;

wherein the projection is a first projection; the connecting member further comprises a second projection; the first and second projections project from the collar section in opposite directions and define the continuous joint surface including a first side region formed by the first projection, a second side region formed by the second projection and a center region formed by the collar section, and located between the first and second side regions; and the end of the hollow frame member is joined to each of the first and second side regions and the center region of the joint surface; and wherein the connecting member further comprises an intermediate section having a hollow portion extending along a predetermined extruding direction along which the hole of the collar section extends.

* * * * *